United States Patent
Shinomoto et al.

(10) Patent No.: US 12,097,886 B2
(45) Date of Patent: Sep. 24, 2024

(54) TRAVEL PLAN GENERATION DEVICE AND AUTONOMOUS DRIVING SYSTEM

(71) Applicant: Mitsubishi Electric Corporation, Tokyo (JP)

(72) Inventors: Rin Shinomoto, Tokyo (JP); Shota Kameoka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 506 days.

(21) Appl. No.: 17/299,782

(22) PCT Filed: Dec. 20, 2018

(86) PCT No.: PCT/JP2018/046933
§ 371 (c)(1),
(2) Date: Jun. 4, 2021

(87) PCT Pub. No.: WO2020/129208
PCT Pub. Date: Jun. 25, 2020

(65) Prior Publication Data
US 2022/0017118 A1   Jan. 20, 2022

(51) Int. Cl.
*B60W 60/00* (2020.01)
*B60W 30/095* (2012.01)
(Continued)

(52) U.S. Cl.
CPC .. *B60W 60/00184* (2020.02); *B60W 30/0956* (2013.01); *B60W 30/10* (2013.01);
(Continued)

(58) Field of Classification Search
CPC ....... B60W 60/00184; B60W 30/0956; B60W 30/10; B60W 40/068; B60W 40/10;
(Continued)

(56) References Cited

U.S. PATENT DOCUMENTS 11,780,437 B2 * 10/2023 Woodley ............. B60W 30/146
701/2
2002/0072841 A1   6/2002 Kogure
(Continued)

FOREIGN PATENT DOCUMENTS

EP   3581449 A1   12/2019
JP   61-155813 A   7/1986
(Continued)

OTHER PUBLICATIONS

International Search Report and Written Opinion mailed on Apr. 2, 2019, received for PCT Application PCT/JP2018/046933, Filed on Dec. 20, 2018, 10 pages including English Translation.

*Primary Examiner* — Abby Y Lin
*Assistant Examiner* — Esvinder Singh
(74) *Attorney, Agent, or Firm* — XSENSUS LLP

(57) ABSTRACT

A travel plan generation device used for an autonomous driving system of a vehicle includes circuitry, in which the circuitry is configured to generate a restriction related to a quantity of state of the vehicle, and generate a target trajectory and a target vehicle speed of the vehicle as a travel plan so as to satisfy the restriction by using a Bayes filter as a state estimation calculation without a convergence calculation.

17 Claims, 10 Drawing Sheets

(51) Int. Cl.
*B60W 30/10* (2006.01)
*B60W 40/068* (2012.01)
*B60W 40/10* (2012.01)

(52) U.S. Cl.
CPC .......... *B60W 40/068* (2013.01); *B60W 40/10* (2013.01); *B60W 2530/20* (2013.01); *B60W 2710/18* (2013.01); *B60W 2710/207* (2013.01)

(58) Field of Classification Search
CPC ......... B60W 2530/20; B60W 2710/18; B60W 2710/207; B60W 10/04; B60W 10/10; B60W 10/18; B60W 10/20; B60W 30/09; B60W 30/0953; B60W 50/0097; B60W 30/095; B60W 40/101; B60W 40/103; B60W 40/105; B60W 40/107; B60W 40/109; B60W 40/114; B60W 2520/14; B60W 2520/20; B60W 2720/14; B60W 2720/20; B60W 2720/26; B60W 2520/26; B60W 2552/40; B60W 60/001; B60W 60/0011; B60W 30/12; B60W 30/143; B60W 30/146; G05D 2201/0213; G05D 1/0246; G05D 1/0891; G05D 1/0212; G05D 1/0214; G05D 1/0223; G08G 1/16; B60K 31/00; B60K 2031/0016; B60K 31/0075

See application file for complete search history.

(56) References Cited

U.S. PATENT DOCUMENTS

| | | | |
|---|---|---|---|
| 2018/0273047 A1* | 9/2018 | Wang | B60W 10/18 |
| 2018/0345958 A1* | 12/2018 | Lo | G08G 1/096725 |
| 2019/0220008 A1* | 7/2019 | Mizuno | B60W 30/146 |
| 2019/0369616 A1* | 12/2019 | Ostafew | H04L 67/12 |
| 2020/0079381 A1* | 3/2020 | Lombrozo | B62D 6/003 |
| 2020/0384999 A1* | 12/2020 | Ohmura | B60W 30/0956 |
| 2021/0053564 A1* | 2/2021 | Imamura | B60T 8/1755 |

FOREIGN PATENT DOCUMENTS

| | | |
|---|---|---|
| JP | 3-249340 A | 11/1991 |
| JP | 2002-127882 A | 5/2002 |
| JP | 2009-166623 A | 7/2009 |
| JP | 2018-154216 A | 10/2018 |
| WO | 2017/138664 A1 | 8/2017 |

* cited by examiner

F I G. 6
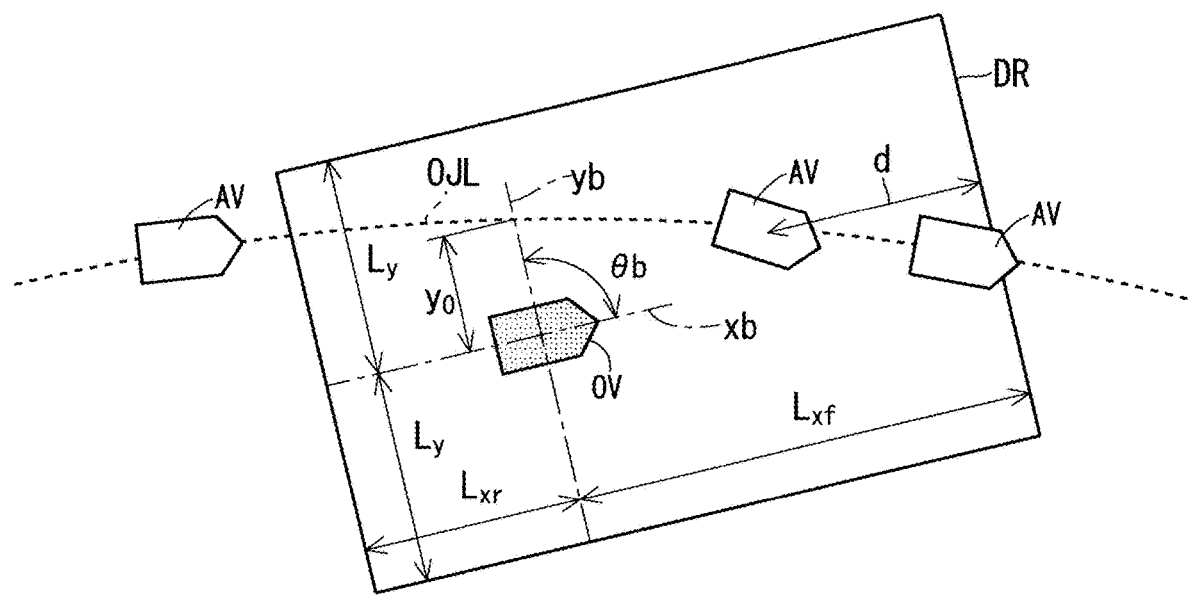

TRAVEL PLAN GENERATION DEVICE AND AUTONOMOUS DRIVING SYSTEM

CROSS-REFERENCE TO RELATED APPLICATION

The present application is based on PCT filing PCT/JP2018/046933, filed Dec. 20, 2018, the entire contents of which are incorporated herein by reference.

TECHNICAL FIELD

The present invention relates to a travel plan generation device, and more particularly to a travel plan generation device that realizes autonomous driving of a vehicle or the like.

BACKGROUND ART

Conventionally, in an autonomous driving system of a vehicle, a method using a convergence calculation has been known as a method of generating a travel plan from a trajectory to be traveled by the vehicle and a vehicle speed. For example, in Patent Document 1, a constraint condition of a travel plan is set according to the condition of a road surface on which the vehicle travels, and the convergence calculation is performed until the travel plan satisfies the constraint condition.

PRIOR ART DOCUMENTS

Patent Documents

[Patent Document 1] Japanese Patent Application Laid-Open No. 2009-166623

SUMMARY

Problem to be Solved by the Invention

In the method of Patent Document 1, the constraint condition is set based on, as constraint conditions, road environment requirements such as road shape information and road friction coefficient, traffic requirements such as traveling on a road, and requirements generated from vehicle performance such as friction circle limits, acceleration/deceleration limits, and steering limits. In the method using the convergence calculation as in Patent Document 1, a local optimum solution is output as a solution depending on the evaluation function and restrictive conditions, causing a case where the travel plan does not converge to the desired solution and a case where it takes some time for the convergence calculation, and an appropriate travel plan may possibly not output in a stable time period.

The present invention has been made to solve the above-mentioned problems, and an object of the present invention is to provide a travel plan generation device that calculates an appropriate travel plan in a stable time period.

Means to Solve the Problem

According to a travel plan generation device of the present invention, the travel plan generation device used for an autonomous driving system of a vehicle includes circuitry, in which the circuitry is configured to generate a restriction related to a quantity of state of the vehicle, and generate a target trajectory and a target vehicle speed of the vehicle as a travel plan so as to satisfy the restriction by using a Bayes filter as a state estimation calculation without a convergence calculation.

Effects of the Invention

According to the travel plan generation device of the present invention, the travel plan is generated using the Bayes filter as the state estimation calculation without a convergence calculation; therefore, the generation of a safe travel plan in a stable calculation time is ensured. Further, by using the state estimation calculation that does not involve the convergence calculation, the overall probability distribution can be estimated by solving it as a state estimation problem that does not involve the convergence calculation, so the frequency of outputting the local optimum solution can be reduced.

BRIEF DESCRIPTION OF DRAWINGS

FIG. 6 A diagram schematically illustrating observation variables.

DESCRIPTION OF EMBODIMENTS

Embodiment 1

Figure 1:
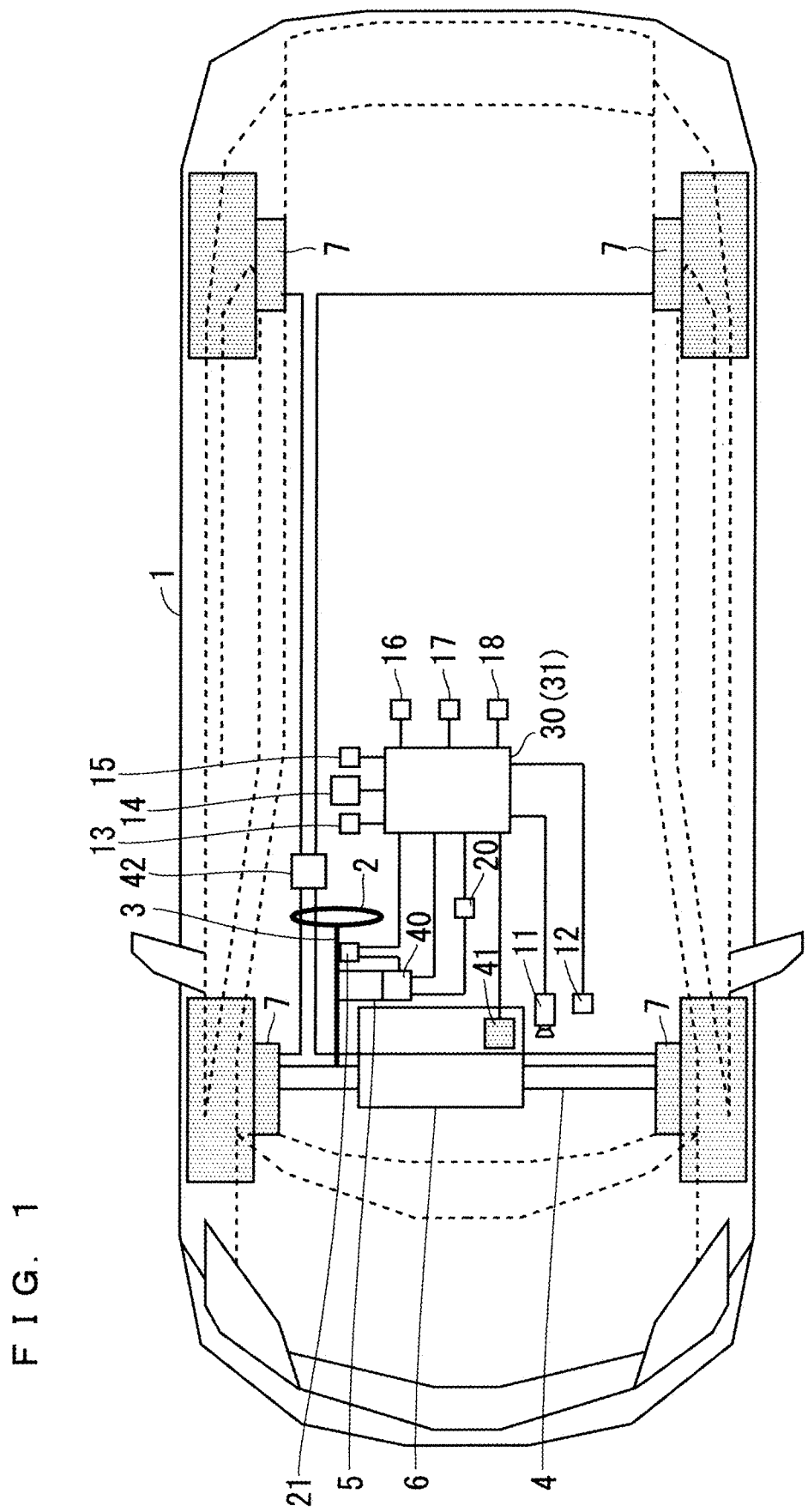
FIG. 1 A diagram illustrating a schematic configuration of a vehicle on which a travel plan generation device according to Embodiment 1 of the present invention is mounted.

FIG. 1 is a system configuration diagram illustrating an example of a schematic configuration of a vehicle 1 on which a travel plan generation device according to Embodiment 1 of the present invention is mounted. As illustrated in FIG. 1, the vehicle 1 includes a steering wheel 2, a steering shaft 3, a steering unit 4, an EPS motor 5, a powertrain unit 6, and a braking unit 7 as a drive system.

Further, the vehicle 1 includes, as a sensor system, a front camera 11, a radar sensor 12, a Global Navigation Satellite System (GNSS) sensor 13, a yaw rate sensor 16, a velocity sensor 17, an acceleration sensor 18, a steering angle sensor 20, and a steering torque sensor 21.

In addition to these, the vehicle 1 includes a navigation device 14, a Vehicle-to-Everything (V2X) receiver 15, a vehicle control unit 30, an Electric Power Steering (EPS) controller 40, a powertrain controller 41, and a brake controller 42.

A travel plan generation device of Embodiment 1 is realized as a part of the vehicle control unit 30. Although the case where the travel plan generation device of Embodiment 1 is applied to an autonomous driving system of a vehicle is illustrated here, the travel plan generation device of Embodiments 1 and 2 are applicable to any moving bodies other than a vehicle traveling by autonomous control, such as an autonomous traveling robot.

The steering wheel 2 installed for a driver to drive the vehicle 1 is coupled to the steering shaft 3. The steering unit 4 is connected to the steering shaft 3. The steering unit 4 rotatably supports two tires of the front wheels as steering wheels, and is steerably supported by a vehicle body frame. Therefore, the torque generated by the operation of the steering wheel 2 by the driver rotates the steering shaft 3, and the steering unit 4 steers the front wheels to the right and left. This allows the driver to control the lateral move amount of the vehicle as the vehicle 1 moves forward and backward. The steering shaft 3 can also be rotated by the EPS motor 5, and by controlling the current flowing through the EPS motor 5 with the EPS controller 40, the front wheels can be freely moved independently of the operation of the steering wheel 2 by the driver.

The vehicle control unit 30 is also referred to as Advanced Driving Assistance Systems-Electronic Control Unit (ADAS-ECU), which is an integrated circuit such as a microprocessor, and includes an Analog/Digital (A/D) conversion circuit, and a Digital/Analog (D/A) conversion circuit, a Central Processing Unit (CPU), a Read Only Memory (ROM), a Random Access Memory (RAM), and the like.

The front camera 11, the laser sensor 12, the GNSS sensor 13, the navigation device 14, the V2X receiver 15, the steering angle sensor 20 detecting a steering angle, the steering torque sensor 21 detecting steering torque, the yaw rate sensor 16 detecting a yaw rate, the velocity sensor 17 detecting a velocity of a subject vehicle, the acceleration sensor 18 detecting acceleration of the subject vehicle, the EPS controller 40, he powertrain controller 41, and the brake controller 42 are connected to the vehicle control unit 30.

The vehicle control unit 30 processes the information input from the connected sensors according to the program stored in the ROM, transmits the target steering angle to the EPS controller 40, transmits the target driving force to the powertrain controller 41, and transmits the target braking force to the brake controller 42.

The front camera 11 is installed at a position where the lane marking lines in front of the vehicle can be detected as an image, and detects the forward environment of the subject vehicle such as lane information and the position of an obstacle based on image information. In Embodiment 1, although only the camera that detects the forward environment of the vehicle 1 is given as an example, cameras that detect the rear and side environments may also be installed. The front camera 11 can also be used to estimate the condition of the road surface on which the vehicle 1 travels.

The radar sensor 12 irradiates the radar and detects the reflected wave to output the relative distance and the relative velocity between the subject vehicle and an obstacle. As the radar sensor, known-type ranging sensors can by adopted such as a millimeter wave radar, a Light Detection and Ranging (LiDAR), a laser range finder, and an ultrasonic radar.

The GNSS sensor 13 receives radio waves from a positioning satellite with an antenna and outputs the absolute position and absolute direction of the vehicle 1 by performing positioning calculation.

The navigation device 14 has a function of calculating an optimum travel route for a destination set by the driver, and stores road information on the travel route. The road information is map node data that shows road alignment, and each map node data incorporates latitude, longitude and elevation information that indicates the absolute position at each node, lane width, cant angle, inclination angle information, and the like.

The V2X receiver 15 has a function of acquiring and outputting information by communicating with other vehicles and roadside units. The information to be acquired includes obstacle information such as the position and velocity of obstacles for the vehicle 1 including other vehicles and pedestrians, and road information such as the friction coefficient of the road surface.

The EPS controller 40 controls the trajectory of the vehicle 1 by controlling the EPS motor 5 so as to realize the target steering angle transmitted from the vehicle control unit 30.

The powertrain controller 41 controls the acceleration of the vehicle 1 by controlling the powertrain unit 6 so as to realize the target driving force transmitted from the vehicle control unit 30.

Although in Embodiment 1, a vehicle using only the engine as a driving force source is given as an example, Embodiment 1 may be applied to a vehicle whose driving force source is only an electric motor, a vehicle whose driving force source is both an engine and an electric motor, and the like.

The brake controller 42 controls the deceleration of the vehicle 1 by controlling the braking unit 7 so as to realize the target braking force transmitted from the vehicle control unit 30.

Figure 2:
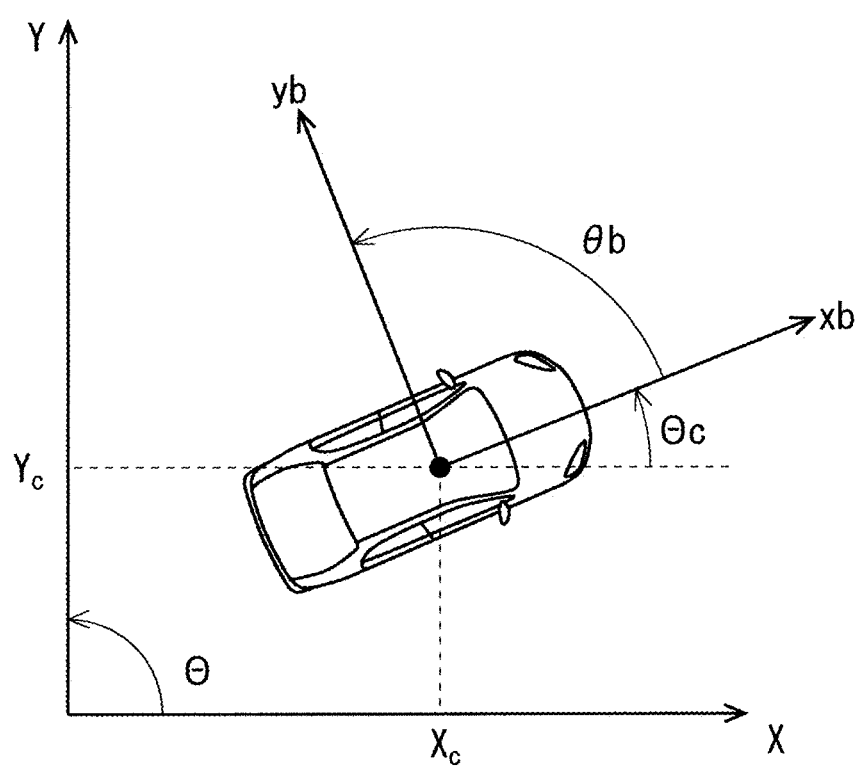
FIG. 2 A diagram schematically illustrated a coordinate system used in Embodiment 1 of the present invention.

FIG. 2 is a diagram schematically illustrated a coordinate system used in Embodiment 1. That is, the X-axis and Y-axis in FIG. 2 represent the inertial system, and Xc, Yc, and Θc indicate the position and orientation of the subject vehicle in the inertial system. xb and yb in FIG. 2 are the subject vehicle coordinate system with the center of gravity of the subject vehicle as the origin, the xb axis in the forward direction of the subject vehicle, and the yb axis in the leftward direction with respect to the forward direction of the subject vehicle.

Figure 3:
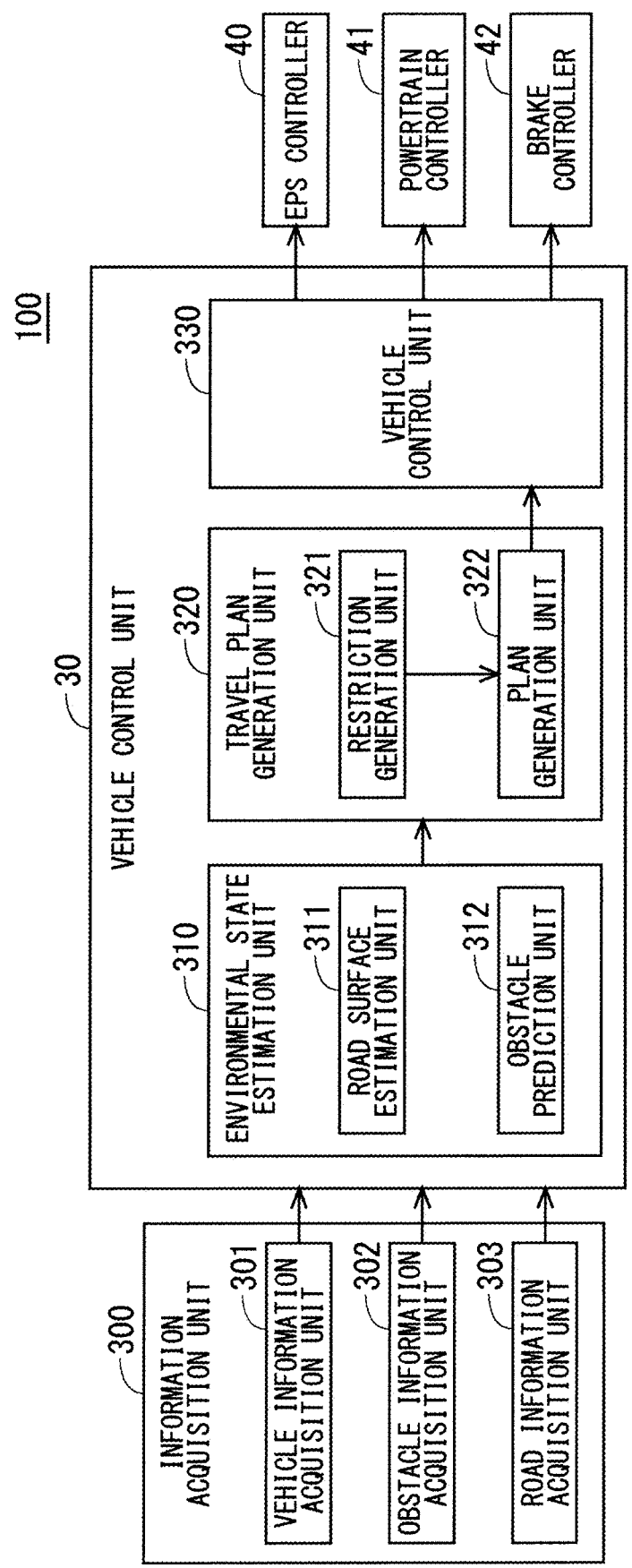
FIG. 3 A functional block diagram of an autonomous driving system to which the travel plan generation device of Embodiment 1 according to the present invention is applied.

FIG. 3 is a functional block diagram of an autonomous driving system 100 to which the travel plan generation device according to Embodiment 1 is applied. The automatic driving system 100 includes the vehicle control unit 30, and an information acquisition unit 300, the EPS controller 40, the powertrain controller 41, and the brake controller 42 are connected to the vehicle control unit 30.

The information acquisition unit 300 has a function of acquiring information on the vehicle 1 and information on the surrounding environment of the vehicle 1, and has a vehicle information acquisition unit 301, an obstacle information acquisition unit 302, and a road information acquisition unit 303. The information acquisition unit 300 can also be referred to as an information acquisition device.

The vehicle information acquisition unit 301 acquires the vehicle information being information on the vehicle 1. The vehicle information includes a quantity of state of vehicle 1 showing the state of vehicle 1. The GNSS sensor 13, the yaw rate sensor 16, the velocity sensor 17, the acceleration sensor 18, the steering angle sensor 20, and the steering torque sensor 21 are included in the vehicle information acquisition unit 301.

The obstacle information acquisition unit 302 acquires the obstacle information being information on obstacles around the vehicle 1. The front camera 11, the radar sensor 12, and the V2X receiver 15 are included in the obstacle information acquisition unit 302.

The road information acquisition unit 303 acquires the road information being information on the road on which the vehicle 1 travels. The front camera 11, the navigation device 14, and the V2X receiver 15 are included in the obstacle information acquisition unit 302. The obstacle information and the road information are information on the surrounding environment of the vehicle 1.

The vehicle control unit 30 includes an environmental state estimation unit 310, a travel plan generation unit 320, and a vehicle control unit 330.

The environmental state estimation unit 310 has a function of estimating information that cannot be directly obtained from the information acquisition unit 300 based on the information on the surrounding environment of the vehicle 1 obtained from the information acquisition unit 300 and a function of outputting the estimated information to the travel plan generation unit 320. The environmental state estimation unit 310 may also use the information on the vehicle 1 if necessary.

The environmental state estimation unit 310 includes a road surface estimation unit 311 and an obstacle prediction unit 312. The road surface estimation unit 311 has a function of estimating the friction coefficient of the road surface on which the vehicle 1 travels by using, for example, a method disclosed in Japanese Patent Application Laid-Open No. 3-249340 (estimation apparatus for frictional coefficient of road surface).

The obstacle prediction unit 312 has a function of predicting a predicted trajectory of an obstacle around the vehicle 1 by using, for example, a method disclosed in Japanese Patent Application Laid-Open No. 61-155813 (mobile object position estimation device). The environmental state estimation unit 310 can also be referred to as an environmental state estimation device.

The travel plan generation unit 320 has a function of calculating a travel plan including a target trajectory and a target vehicle speed for the vehicle 1 to follow controlled by the autonomous driving system, and also has a function of outputting information on the travel plan to the vehicle control unit 330. The travel plan generation unit 320 can also be referred to as a travel plan generation device. The details of the travel plan generation unit 320 will be described later.

The vehicle control unit 330 has a function of calculating target steering angle for outputting to the EPS controller 40 using target trajectory information obtained from the travel plan generation unit 320 and the quantity of state of vehicle 1 obtained as vehicle information from the information acquisition unit 300 and outputting the target steering angle.

Further, the vehicle control unit 330 has a function of calculating a target driving force for transmitting to the powertrain controller 41 and a target braking force for transmitting to the brake controller 42 using target vehicle speed information obtained from the travel plan generation unit 320 and the quantity of state of vehicle 1 obtained from the information acquisition unit 300 and outputting the target driving force and the target braking force. The vehicle control unit 330 can also be referred to as a vehicle control device.

Hereinafter, the details of the travel plan generation unit 320 will be described below. The travel plan generation unit 320 includes a restriction generation unit 321 and a plan generation unit 322.

The restriction generation unit 321 has a function of generating a restriction related to the quantity of state of vehicle 1 and outputting the restriction to the plan generation unit 322 for use in generating a travel plan. Based on the friction coefficient of the road surface estimated by the road surface estimation unit 311 of the environmental state estimation unit 310, after imposing a constraint condition in which the tire generating force, which is the force generated by the tire of vehicle 1 in the horizontal plane, does not exceed the friction circle limit of the road surface, the restriction generation unit 321 calculates a range of values that the quantity of state of vehicle 1 can take in order to satisfy the constraint condition, and sets the restriction regarding the quantity of state of vehicle 1.

By setting such a constraint condition, generation of a travel plan capable of preventing the vehicle 1 from slipping is ensured.

When the autonomous driving system does not include the road surface estimation unit 311, the restriction generation unit 321 can also obtain a restriction on the quantity of state of vehicle 1 by using the friction coefficient of a preset virtual road surface.

The quantity of state of vehicle 1 to be set as a restriction includes at least one of or a combination of following, for example, a sideslip angle of vehicle body, a sideslip angle of tire, the steering angle, the steering angular velocity, the velocity of vehicle body, the acceleration of vehicle body, and the yaw rate, and the restriction is set as a range of values that these quantities of state of vehicle 1 can take. Accordingly, a travel plan with the quantity of state of vehicle 1 being taken into consideration is created. In Embodiment 1, the steering angle is taken as an example.

The cornering force generated by the friction between the tire and the road surface increases linearly as the sideslip angle increases when the sideslip angle of tire is small. However, when the sideslip angle becomes larger than a certain level and the cornering force approaches the friction circle limit, the increase thereof becomes gradual, and finally reaches the friction circle limit and saturates. The sideslip angle of tire when the cornering force is saturated is referred to here as the saturated sideslip angle $\beta$st. When the sideslip angle of tire reaches the saturated sideslip angle $\beta$st, the cornering force reaches the friction circle limit and slip occurs. Therefore, assuming that the force generated in the vertical direction of the tire is sufficiently small, the constraint condition that the tire generating force does not exceed the friction circle limit of the road surface is replaceable by the condition that the sideslip angle of tire does not exceed the saturated sideslip angle $\beta$st.

Further, if the vehicle motion is approximated by the steady circular turning of the equivalent two-wheel model, the sideslip angle of tire can be expressed by the vehicle speed V, the steering angle $\delta$, and other vehicle parameters. This enables the replacement of the condition regarding the sideslip angle of tire by the condition regarding the steering angle.

As described above, deriving of the restriction regarding the steering angle that can be used for the plan generation calculation in the plan generation unit 322 from the condition that the tire generating force does not exceed the friction circle limit is ensured.

Figure 4:
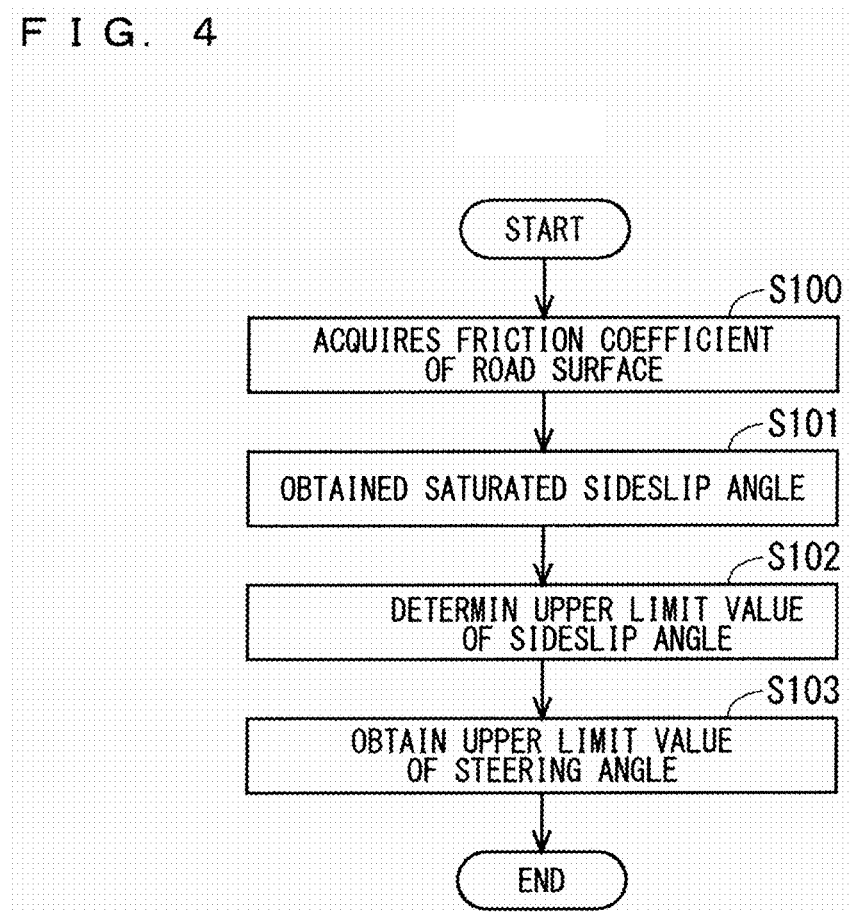
FIG. 4 A flowchart illustrating a flow of restriction generation calculation.

FIG. 4 is a flowchart illustrating a flow of restriction generation calculation in the restriction generation unit 321 when the restriction object is the steering angle. The steering angle is represented by the absolute value of the angle.

First, in Step S100, the restriction generation unit 321 acquires the friction coefficient μ of the road surface from the road surface estimation unit 311.

Next, in Step S101, the saturated sideslip angle βst is obtained from the friction coefficient. The saturated sideslip angle βst is represented by following Expression (1) using a tire vertical load Wv measured in advance, a cornering stiffness K, and the friction coefficient μ obtained in Step S100.

[Expression 1]

$$\beta_{st} = \tan^{-1}\left(3 \cdot \mu \cdot \frac{Wv}{K}\right) \quad (1)$$

Here, the cornering stiffness refers to the cornering force per unit sideslip angle when the sideslip angle is small.

Next, in Step S102, an upper limit value of sideslip angle is determined. The saturated sideslip angle of the tire βst obtained in Step S101 is obtained by setting the tire vertical load Wv and cornering stiffness K as constants, however, an accurate βst is difficult to obtain due to the actual changes in these parameters depending on the number of passengers, acceleration/deceleration in the vertical direction (vehicle length direction) of the vehicle, aging of the vehicle, etc. Therefore, even if the sideslip angle is less than βst, when a value close to this is taken, the friction circle limit is exceeded and probability of slip occurring is high. Therefore, using a safety factor $S_\beta$ set in advance, the upper limit value of sideslip angle $\beta_{mx}$ in the plan generation is determined by following Expression (2). The safety factor $S_\beta$ is a positive value of 1 or less, and is typically a value of less than 1.

[Expression 2]

$$\beta_{mx} = \beta_{st} \cdot S_\beta \quad (2)$$

Next, in Step S103, an upper limit value of steering angle is obtained. A method of obtaining the upper limit value of steering angle $\delta_{mx}$, which brings the sideslip angle of tire βt to be equal to or less than the upper limit value of sideslip angle $\beta_{mx}$, will be described below.

In the equivalent two-wheel model, the sideslip angles $\beta_f$ and $\beta_r$ of the front and rear wheels are given by following Expressions (3) and (4), respectively.

[Expression 3]

$$\beta_f = \beta + \frac{l_f r}{V} - \delta \quad (3)$$

[Expression 4]

$$\beta_r = \beta - \frac{l_r r}{V} \quad (4)$$

Here, "β" represents the sideslip angle of vehicle body, "r" represents the yaw rate, "V" represents the vehicle speed, "δ" represents the steering angle, and "$l_f$" and "$l_r$" represent the center of gravity of the vehicle and the distance between the front and rear wheels, respectively. Further assuming a steady circular turning, the sideslip angle and yaw rate of the vehicle body are given by following Expressions (5) and (6), respectively.

[Expression 5]

$$\beta = \left(\frac{1 - \frac{m}{2L}\frac{l_f}{l_r K_r}V^2}{1 - \frac{m}{2L^2}\frac{l_f K_f - l_r K_r}{K_f K_r}V^2}\right)\frac{l_r}{L}\delta \quad (5)$$

[Expression 6]

$$r = \left(\frac{1}{1 - \frac{m}{2L^2}\frac{l_f K_f - l_r K_r}{K_f K_r}V^2}\right)\frac{V}{L}\delta \quad (6)$$

Here, "$K_f$" and "$K_r$" represent the cornering stiffness of the front and rear wheels, respectively, and L represents the wheelbase.

The sideslip angles of the front and rear wheels are given by following Expressions (7) and (8), respectively.

[Expression 7]

$$\beta_f = \left(\frac{-mV^2}{2L^2 K_f K_r - m(l_f K_f - l_r K_r)V^2}\right)l_r K_r \delta \quad (7)$$

[Expression 8]

$$\beta_r = \left(\frac{-mV^2}{2L^2 K_f K_r - m(l_f K_f - l_r K_r)V^2}\right)l_f K_f \delta \quad (8)$$

Furthermore, assuming that there is no oversteer, $l_f K_f - l_r K_r \leq 0$ gives $|\beta_r| \leq |\beta_f|$.

Therefore, in order to limit the sideslip angle of tire of the vehicle model to the upper limit value $\beta_{mx}$ or less, following Expression (9) needs only be satisfied.

[Expression 9]

$$|\beta_f| \leq \beta_{mx} \quad (9)$$

From the sideslip angle of the front wheel shown in Expression (7), the absolute value of the steering angle δ is represented by Expression (10).

[Expression 10]

$$|\delta| = \frac{1}{K_r l_r}\frac{2L^2 K_f K_r - m(l_f K_f - l_r K_r)V^2}{mV^2}|\beta_f| \quad (10)$$

Therefore, if the upper limit value of steering angle $\delta_{mx}$ is set to satisfy following Expression (11), the condition regarding the sideslip angle is satisfied.

[Expression 11]

$$\delta\, mx = \frac{1}{K_r l_r}\frac{2L^2 K_f K_r - m(l_f K_f - l_r K_r)V^2}{mV^2}\beta\, mx \quad (11)$$

As can be seen from Expression (11), the smaller the upper limit value of sideslip angle $\beta_{mx}$, the smaller the upper limit value of steering angle $\delta_{mx}$. Therefore, the smaller the friction coefficient of the road surface, the smaller the upper limit value of steering angle $\delta_{mx}$.

The upper limit value of steering angle $\delta_{mx}$ obtained by the above method is output to the plan generation unit 322 as a restriction, and the restriction generation calculation is completed.

In the above description, the case where the restriction target is the steering angle has been described. However, even when the restriction target is, for example, acceleration or deceleration, the smaller the friction coefficient of the road surface, the smaller the upper limit value of acceleration or deceleration as well.

The plan generation unit 322 has a function of generating a travel plan including the target trajectory and the target vehicle speed for the autonomous driving system to follow by a state estimation calculation without a convergence calculation based on the information obtained from the information acquisition unit 300 and outputting the travel plan to the vehicle control unit 330. In Embodiment 1, a particle filter is used as the state estimation calculation.

Figure 5:
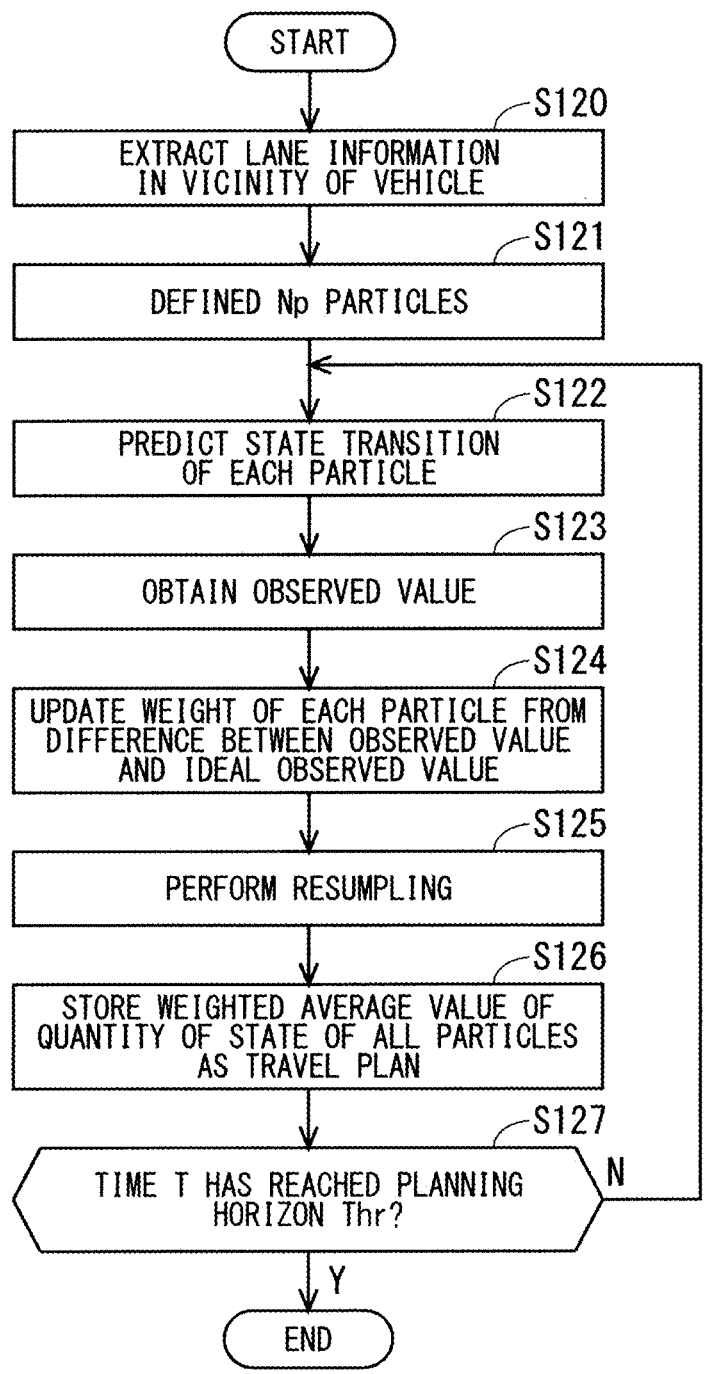
FIG. 5 A flowchart illustrating a flow of a plan generation calculation.

FIG. 5 is a flowchart illustrating a flow of the plan generation calculation in the plan generation unit 322.

First, in Step S120, the plan generation unit 322 extracts lane information in the vicinity of the vehicle from the information obtained from the information acquisition unit 300. As a method of acquiring the lane information in the information acquisition unit 300, for example, a method is given in which an edge detection process is performed on an image taken by the front camera 11, the lines constituting the lane marking lines are approximately obtained, and the lane information is obtained based on the obtained approximate lines. Further, a method is given in which the V2X receiver 15 is used to connect to the network, the vehicle position is transmitted, and a map of the vicinity of the vehicle is received via the network, however, Embodiment 1 is not limited thereto, the effect in Embodiment 1 is not affected by whichever method is used to acquire lane information. In Embodiment 1, a method will be described in which information obtained from the navigation device 14 and information obtained from the GNSS sensor 13 are combined. The method will be described below.

First, the position and azimuth of the vehicle 1 are acquired from the GNSS sensor 13. By matching the acquired position of the vehicle 1 with the road information stored in the navigation device 14, map node data in the vicinity of the vehicle 1 can be obtained. The map node data is extracted as a map point cloud for Ng points. An Ng is an integer greater than or equal to 2. The plan generation unit 322 converts the extracted map point cloud into the subject vehicle coordinate system using the azimuth of the vehicle.

Next, in Step S121, Np particles are defined based on the current state of the vehicle. A particle is a data group consisting of the values (quantities of state) of each state variable, the plurality of determined state variables are, for example, a position, azimuth, velocity, acceleration, steering angle, steering angle velocity, yaw rate, of the vehicle, a sideslip angle of vehicle body, and the like. Each particle has its own quantity of state.

An appropriate travel plan can be created by performing a state estimation calculation using the state variables.

The particle filter is a method for predicting time series data based on a probability density distribution, and is sometimes referred to as the sequential Monte Carlo method. Further, the particle filter as a state estimation calculation approximates the probability density distribution of a state by a plurality of particles. For example, if there are many particles having a certain quantity of state, the probability density of the state is high.

Using the particle filter as the state estimation operation enables to estimate the overall probability density distribution, so that the frequency of outputting the local optimum solution can be reduced.

Each Np particle has a different quantity of state. An Np is an integer greater than or equal to 2. In Embodiment 1, a quantity of state of particle P has the two-dimensional positions xb, yb, azimuth θb, vehicle speed V, steering angle δ, acceleration a and steering angular velocity u of the vehicle, and is represented by following Expression (12).

[Expression 12]

$$P=[x_b y_b \theta_b V \delta a u]^T \quad (12)$$

Here, the two-dimensional positions xb, yb and the direction θb are represented by the subject vehicle coordinate system at the current position of the vehicle. In addition, a quantity of state of nth particle is expressed as Pn. The initial values of the state variables are the same for all particles, "xb", "yb" and "θb" are 0, "V" is the current vehicle speed, "δ" is the current steering angle, "a" and "s" are 0. Further, it is assumed that the weight W is defined for each particle, the initial value is the same for all particles, and the weight W is represented by following Expression (13). Also, define the time T and set the initial value 0.

[Expression 13]

$$W=1/Np \quad (13)$$

Next, in Step S122, the plan generation unit 322 uses a random number for each particle to predict the state after a discrete time width Td based on the restriction. The method of predicting the particles state will be described below.

The prediction of particles state is performed using a system model, and the model to be used in Embodiment 1 will be described below. The state variables for the system model are the two-dimensional position xb, yb, azimuth θb, vehicle speed V and steering angle δ of the particles, and the quantity of state Px is represented by following Expression (14).

[Expression 14]

$$P_x=[x_b y_b \theta_b V \delta]^T \quad (14)$$

Further, the input value Pu to the system model is composed of the acceleration a and the steering angular velocity u of the vehicle, and is represented by following Expression (15).

[Expression 15]

$$P_u=[a u]^T \quad (15)$$

Further, the sideslip angle of vehicle body β is represented by following Expression (16).

[Expression 16]

$$\beta=\tan^{-1}(\tan(\delta)/2) \quad (16)$$

In this case, the system model is represented by following Expression (17) as a differential equation using the wheelbase L of the vehicle.

[Expression 17]

$$\frac{dPx}{dt} = \begin{bmatrix} V \cdot \cos(\theta+\beta)/\cos(\beta) \\ V \cdot \sin(\theta+\beta)/\cos(\beta) \\ V \cdot \tan(\delta)/L \\ a \\ u \end{bmatrix} \quad (17)$$

Although the system model described above can be said to be a kinematic model that approximates four wheels to two wheels and excludes mechanics, other vehicle motion models such as a two-wheel model that is a dynamic model that approximates four wheels to two wheels or the like are used.

Among the input variables to the system model, for the acceleration a, the values that satisfy following Expression (18) for the preset upper limit value $a_{mx}$ and lower limit value $a_{mn}$ are determined using random numbers for each particle.

[Expression 18]

$$a_{mx} \geq a \geq a_{mn} \qquad (18)$$

Among the input variables to the system model, as to the steering angular velocity u, regarding the preset upper limit value $u_{mx}(>0)$, the first constraint condition of the steering angular velocity u is to satisfy following Expression (19).

[Expression 19]

$$u_{mx} \geq |u| \qquad (19)$$

Further, regarding the upper limit value $\delta_{mx}(>0)$ of the steering angle obtained from the restriction generation unit 321 as a restriction on the quantity of state of vehicle 1, the second constraint condition of the steering angular velocity u is for the steering angle δ' after the discrete time width Td to satisfy following Expression (20).

[Expression 20]

$$\delta_{mx} \geq |\delta'| \qquad (20)$$

The steering angle δ' after the discrete time width Td is represented by following Expression (21).

[Expression 21]

$$\delta' = \delta + u \cdot Td \qquad (21)$$

Therefore, the second constraint condition is represented by following Expression (21).

[Expression 22]

$$(\delta_{mx} - \delta)/Td \geq u \geq -(\delta_{mx} + \delta)/Td \qquad (22)$$

Among the input values Pu to the system model, the steering angular velocity u determines the values that satisfy the first constraint condition and the second constraint condition by using random numbers for each particle.

As described above, the quantity of state Px' after the discrete time width Td is predicted by the system model described above using the input value Pu determined based on the steering angle upper limit value $\delta_{mx}$ being the restriction. This enables the prediction of particles state with the restriction being taken into consideration.

The quantity of state of particle is updated using the predicted quantity of state Px' and the input value Pu, and is represented by following Expression (23).

[Expression 23]

$$P = [Px'^T \ Pu^T]^T \qquad (23)$$

The quantity of state, the predicted quantity of state, and input value of the particles are all vertical vectors, and are represented using translocation as in above Expression (23) for simplification.

Further, the value obtained by adding the discrete time width Td to the time T is set as the updated time. At this time, using the predicted trajectory of surrounding obstacles obtained from the obstacle prediction unit 312, whether or not an obstacle exists in the area where the vehicle exists in each particle at the same time is determined, and when the obstacle exists, the weight W of the particle is set to 0. This enables to generate a travel plan that avoids contact between vehicle 1 and obstacles.

Next, in Step S123, the observed value from the updated quantity of state of each particle is obtained. Observation variables are defined based on targets of the travel plan. The targets of the travel plan are given from the outside of the plan generation unit 322 according to the travel state of the vehicle 1 or the setting by a user. In Embodiment 1, the targets are to maintain the target vehicle speed, drive in the center of the lane, and maintain a safe distance from surrounding obstacles. Based on the targets, the observed value Py is represented by following Expression (24) with the vehicle speed V, a lateral deviation from vehicle to target lane y0, and an invasion distance of obstacle into dangerous area d as observation variables.

[Expression 24]

$$P_y = [V y0 d]^T \qquad (24)$$

The observed variables may include at least one of the vehicle speed V, the lateral deviation from vehicle to target lane y0, and the invasion distance of obstacle into dangerous area d. This enables to generate a travel plan that avoids contact between vehicle 1 and obstacles.

FIG. 6 is a diagram schematically illustrating the above observation variables. In FIG. 6, the subject vehicle OV is hatched, and the other vehicle AV, which is an obstacle, is not hatched. The lateral deviation y0 to a target lane OJL is the value of yb at the intersection of the target lane OJL and the yb axis when the lane is represented by the subject vehicle coordinate system in the positions and azimuth of the particles. However, for the position of the target lane, the lane information obtained in Step S120 is used.

Further, the invasion distance d into a dangerous area DR is the maximum value of the vertical distance in which each obstacle invades the dangerous area DR set based on the positions of the particles, that is, the maximum value of the distance in the direction along the xb axis. Here, the dangerous region DR is indicated by the orientations of the particles, that is, a rectangular region whose long side is tilted with respect to the azimuth θb.

The danger zone DR is defined as having a width of Lxf in the front, Lxr in the rear, and Ly in the right and left from the particles, and is set around the subject vehicle OV.

Here, the length Lxf is represented by following Expression (25) using the vehicle speed V and a preset safety estimated time Ts of the particles.

[Expression 25]

$$L_{xf} = V \cdot T_s \qquad (25)$$

Further, the lengths Lxr and Ly are represented by following Expressions (26) and (27) using preset parameters Tsr and Tsy, respectively.

[Expression 26]

$$L_{xr} = V \cdot T_{sr} \qquad (26)$$

[Expression 27]

$$L_y = V \cdot T_{sy} \qquad (27)$$

Here, returning to the description of the flowchart of FIG. 5, and next, in Step S124, the weight W of each particle is updated from the difference between the observed value Py of each particle and the ideal observed value Pyi. Here, the ideal observed value Pyi is an observed value for the vehicle 1 in the ideal state virtually set, and is determined from the target of the travel plan. When the vehicle 1 satisfies the target of the travel plan, vehicle 1 is in the ideal state. In Embodiment 1, the ideal observed value Pyi is composed of the target vehicle speed Vnom, the target lateral deviation y0nom, and the target invasion area dnom, and is represented by following Expression (28).

[Expression 28]

$$P_{yi}=[V_{nom} y0_{nom} d_{nom}]^T \quad (28)$$

The weight W before updating each particle is redefined as Wp. The weight W is proportional to the weight Wp before the update and the likelihood α, and is updated so that the integrated value of the weights of all particles is 1.

The weight Wn of the nth particle is represented by following Expression (29).

[Expression 29]

$$W_n = \frac{W_{pn} \cdot a_n}{\sum_{m=1}^{Np} W_{pm} \cdot a_m} (n=1...N_p) \quad (29)$$

Here, the likelihood a is obtained by following Expression (30) using the covariance matrix Q regarding the quantity of state Px of the particles and the covariance matrix R regarding the observed value Py, which are set in advance.

[Expression 30]

$$a = \frac{1}{(\sqrt{2\pi})^2 \sqrt{|\Pi|}} \cdot \exp\left(-\frac{1}{2}(P_{yi}-P_y)^T \Pi^{-1}(P_{yi}-P_y)\right) \quad (30)$$

Here, the matrix Π is represented by following Expression (31).

[Expression 31]

$$\Pi = HQH^T + R \quad (31)$$

However, the value Hn of the measurement matrix H in the nth particle is represented by following Expression (32), where the measurement function h is differentiated by the state quantity Px when Px=Pxn.

[Expression 32]

$$Hn = \frac{\partial h}{\partial P_x}\bigg|_{P_x = P_{xn}} \quad (32)$$

The measurement function h is a function for obtaining the observed value Py from the quantity of state Px, and is represented by following Expression (33).

[Expression 33]

$$Px = h(Py) \quad (33)$$

Next, in Step S125, particle resampling is performed based on the weight of each particle. However, in order to prevent a significant decrease in the number of particles, resampling is performed only when the number of effective particles Neff is equal to or greater than the threshold Nth, and nothing is performed in Step S125 in other cases.

Here, the number of effective particles Neff is represented by following Expression (34).

[Expression 34]

$$N_{eff} = \frac{1}{\sum_{n=1}^{Np} (W_n)^2} \quad (34)$$

In the resampling, sampling is performed at equal intervals from the empirical distribution function, as in the case of a typical particle filter. When resampling is performed, the weight resetting is performed based on following Expression (35) such that the weights of each particle are set to be equal and.

[Expression 35]

$$W = 1/Np \quad (35)$$

Next, in Step S126, a weighted average value is calculated for the positions of the particles and the vehicle speed, and the position data and the vehicle speed data are stored in the plan generation unit 322 as a travel plan.

Next, in Step S127, whether or not the time T has reached the planning horizon Thr, which is the planning target period of the plan generation. When time T is determined to be less than the planning horizon Thr, the process returns to Step S122. When it is determined that the time T is equal to or greater than the planning horizon Thr, the position data stored as the travel plan is output as the target trajectory and the vehicle speed data is output as the target vehicle speed, and the calculation of plan generation is completed.

Figure 7:
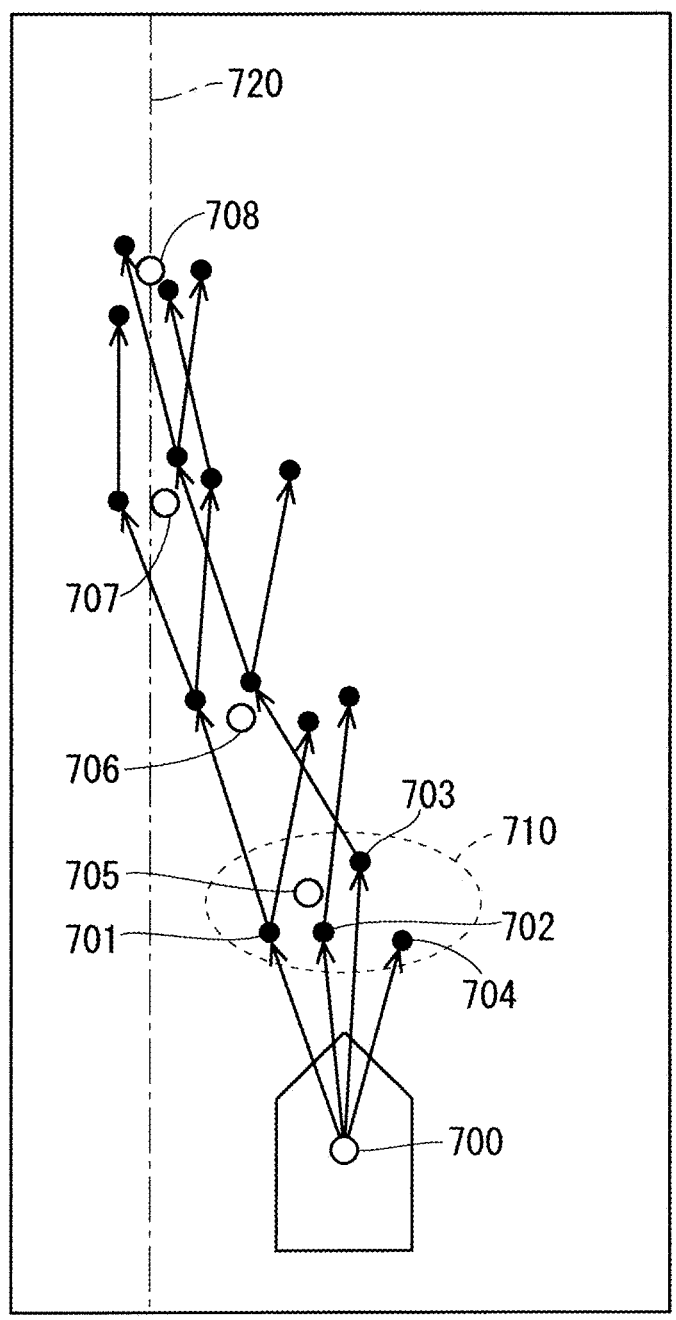
FIG. 7 A diagram schematically illustrating a plan generation calculation result.

FIG. 7 is a diagram schematically illustrating the above plan generation calculation result. Although the actual number of particles Np is about 50 at minimum, the number represented here is four for the sake of simplicity.

In FIG. 7, the initial value 700 of all particles is set based on the current state of the vehicle, so they have the same value at the start. For these particles, the state transitions of each are predicted through the processes described using Expressions (12) to (22), and the quantities of state of particles are updated using Expression (23) for particles 701 to 704 to obtain updated values thereof. These values have the variance as illustrated in the region 710 surrounded by the broken line in FIG. 7 based on the upper limit value of the steering angle obtained as a restriction and the upper and lower limit values of the input variables set in advance.

Then, the weight of each particle is obtained according to the target lane 720, the target vehicle speed, and the positional relationship with the obstacle through the processes described using Expressions (24) to (35) for each of the updated particles. And resampling is performed according to the weight. Here, it is assumed that the weight of the particle 701 is large and the weight of the particle 704 is small, so that the particle 701 increases and the 704 disappears. Subsequently, the weighted average value 705 having the states of the particles 701 to 703 is stored as a travel plan at this time. The same process is repeated for each particle to obtain travel plans 705 to 708.

Figure 8:
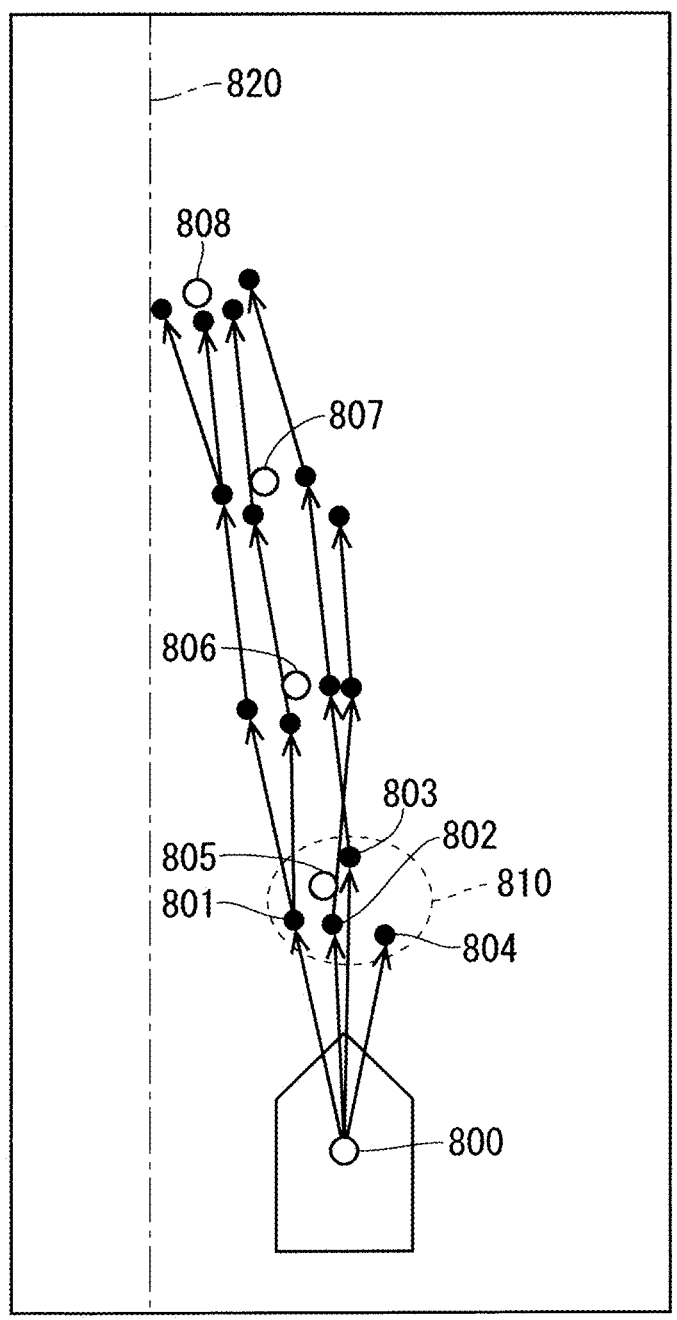
FIG. 8 A diagram schematically illustrating a plan generation calculation result.

FIG. 8 is a diagram schematically illustrating a plan generation calculation when the upper limit of the steering angle, which is a restriction, is smaller than that in the case of FIG. 7. That is, FIG. 8 is a diagram schematically illustrating the result of the plan generation calculation when the friction coefficient of the road surface is smaller than that of FIG. 7.

In FIG. 8, an initial value 800 of all particles is set based on the current state of the vehicle, and first, the particle update values 801 to 804 are obtained by predicting the state transitions. At this time, since the upper limit of the steering angle obtained as a restriction is small, the lateral dispersion of the particles becomes small as in the region 810 surrounded by the broken line in FIG. 8. As a result, the obtained travel plans 805 to 808 have a smaller amount of lateral movement in the same time than the travel plans 705 to 708 illustrated in FIG. 7.

According to the configuration of the travel plan generation unit 320 described above, by using the state estimation calculation represented by the particle filter, the generation of a travel plan that avoids contact between the vehicle and an obstacle without using the convergence calculation is ensured. As a result, a travel plan can be obtained in a stable calculation time without outputting a local optimal solution, so that an autonomous driving system with high safety can be realized.

Here, the convergence calculation is a calculation that is repeated until the evaluation value satisfies a predetermined condition, and although the upper limit number of times can be set, the operation time is not stable because the number of times of repetition changes depending on the condition. When performing a convergence calculation, a local optimal solution may possibly be output depending on the evaluation function and restrictive condition, however, a local optimal solution is not a desirable solution in many cases.

On the other hand, a calculation that does not involve a convergence calculation is a calculation that is repeated a predetermined number of times, so that the calculation time is stable.

By using the state estimation calculation that does not involve the convergence calculation, the overall probability distribution can be estimated by solving it as a state estimation problem that does not involve the convergence calculation, so the frequency of outputting the local optimum solution can be reduced.

In Embodiment 1, the particle filter has been described as an example of the state estimation calculation, however, other calculations such as a Kalman filter and an extended Kalman filter can also be used as the state estimation calculation. For example, if the system model and the measurement function h can be regarded as linear, the Kalman filter can be used. Further, the extended Kalman filter can also be used when the system model and measurement function h cannot be regarded as linear. If a particle filter is used, more accurate state estimation is ensured as compared with the case where the Kalman filter or the extended Kalman filter is used. The Particle filter, Kalman filter and extended Kalman filter are also referred to collectively as Bayesian filter.

Embodiment 2

Although, the restriction generation calculation of Embodiment 1 described above is performed using the road surface friction coefficient estimated by the road surface estimation unit 311 of the environmental state estimation unit 310 illustrated in FIG. 3, in the road information acquisition unit 303 of the information acquisition unit 300, for example, use the V2X receiver 15 (FIG. 1) that has a function to acquire the coefficient of friction of the road surface, and the restriction generation unit 321 of the travel plan generation unit 320 may generate a restriction based on the road surface friction coefficient acquired from the outside of the vehicle by the road information acquisition unit 303.

Figure 9:
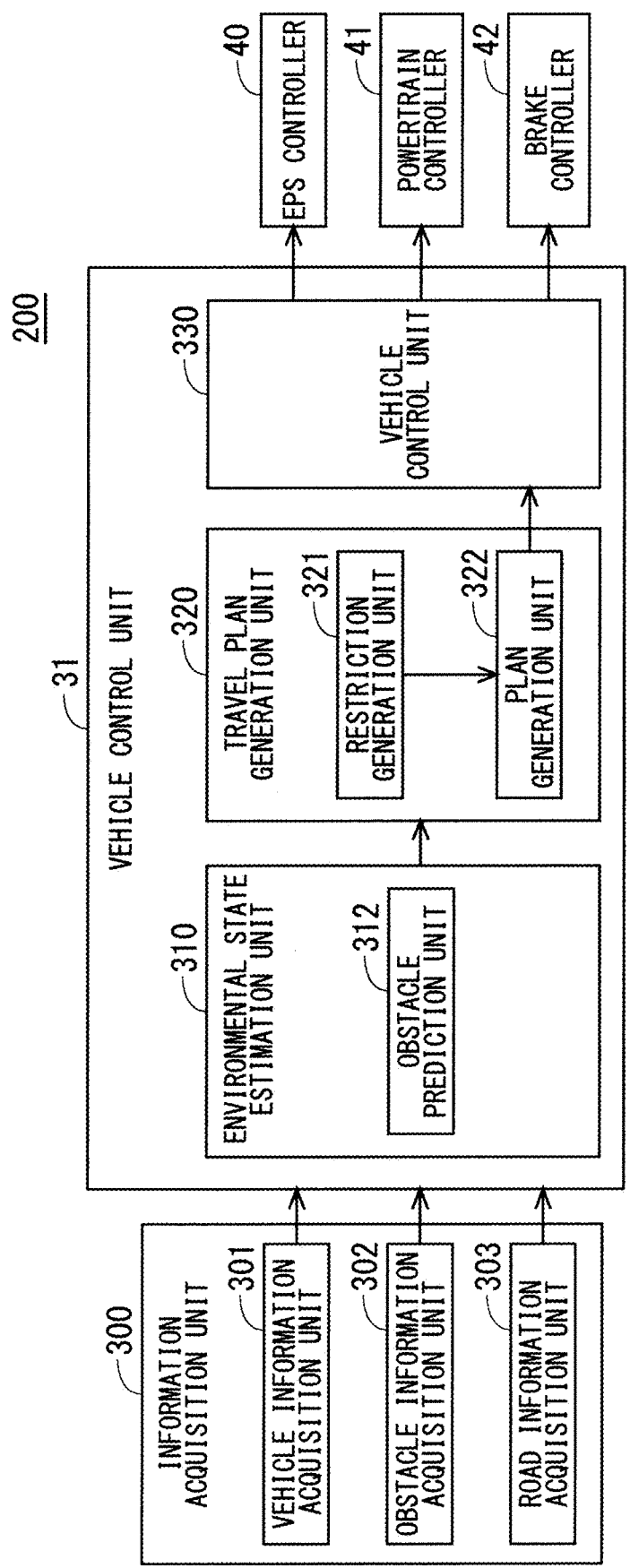
FIG. 9 A functional block diagram of an autonomous driving system to which the travel plan generation device of Embodiment 2 according to the present invention is applied.

FIG. 9 is a functional block diagram of an autonomous driving system 200 to which the travel plan generation device according to Embodiment 2 is applied. It should be noted that, in FIG. 9, the same components as those of the autonomous driving system 100 described with reference to FIG. 3 are denoted by the same reference numerals, and overlapping descriptions are omitted.

In the vehicle control unit 31 of the autonomous driving system 200 illustrated in FIG. 9, the environmental state estimation unit 310 does not have the road surface estimation unit 311 and the autonomous driving system 200 is configured to generate a restriction based on the road surface friction coefficient acquired from the outside of the vehicle by the road information acquisition unit 303.

According to this configuration, the road surface estimation unit 311 becomes unnecessary and the calculation load is reduced, and the friction coefficient of the road surface can be acquired in advance, so that slip can be prevented more reliably.

Here, as the V2X receiver 15, for example, by using a V2I (Vehicle to Infrastructure) receiver that communicates with a camera that acquires an image of the road surface as a road shoulder infrastructure and an infrastructure that estimates the road surface condition based on the information obtained from the camera information on the coefficient of friction of the road surface can be obtained. As a method of estimating the road surface condition based on the camera that acquires the image of the road surface and the information obtained from the camera, a method disclosed in Japanese Patent Application Laid-Open No. 2002-127882 is given, for example in which whether the road surface is a snow road, an asphalt wet road surface, or an asphalt dry road surface, and the coefficient of friction of the road surface is estimated based on the determined road surface condition. By estimating and transmitting the road surface condition by the road shoulder infrastructure in this manner, the coefficient of friction of the road surface can be obtained via the V2I receiver.

Further, as the V2X receiver 15, a method of acquiring the coefficient of friction of the road surface estimated by the preceding vehicle by a V2V (Vehicle to Infrastructure) receiver that performs vehicle-to-vehicle communication is also conceivable.

Figure 10:
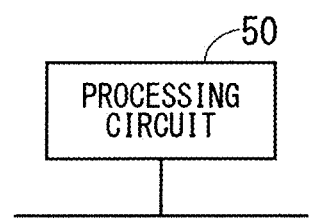
FIG. 10 A diagram illustrating a hardware configuration for realizing the travel plan generation devices of Embodiments 1 and 2 according to the present invention.

Each component of the travel plan generation unit 320 being the travel plan generation device according to Embodiments 1 and 2 described above, can be configured by using a computer, and is realized by the computer executing a program. That is, the travel plan generation unit 320 is realized by, for example, a processing circuit 50 illustrated in FIG. 10. A processor such as a CPU or Digital Signal Processor (DSP) is applied to the processing circuit 50, and the functions of each unit are realized by executing a program stored in the storage device.

Dedicated hardware may also be applied to the processing circuit 50. When the dedicated hardware is applied to the processing circuit 50, the processing circuit 50 corresponds to a single circuit, a composite circuit, a programmed processor, a parallel programmed processor, an Application Specific Integrated Circuit (ASIC), or a Field-Programmable Gate Array (FPGA), or the combination thereof.

Each function of the components of the travel plan generation unit 320 may be realized by an individual processing circuit, or the functions may be collectively realized by one processing circuit.

Figure 11:
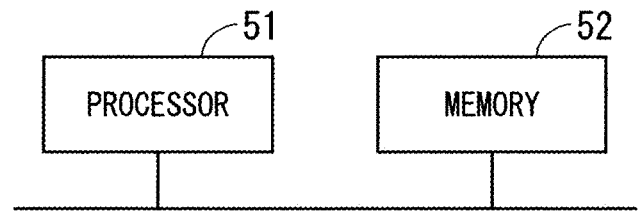
FIG. 11 A diagram illustrating a hardware configuration for realizing the travel plan generation devices of Embodiments 1 and 2 according to the present invention.

Further, FIG. 11 illustrates a hardware configuration when the processing circuit 50 is configured by using a processor. The function of each unit of the travel plan generation unit 320 is realized by software (software, firmware, or a combination of software and firmware) or the like. The software or the like is described as a program and stored in a memory 52. The processor 51, which functions as the processing circuit 50, realizes the function of each unit by reading and executing the program stored in the memory 52 (storage device). That is, it can be said that the program causes the computer to execute the procedure and method of the operation of the components of the travel plan generation unit 320.

Here, the memory 52 may be, for example, a non-volatile or volatile semiconductor memory, such as a RAM, a ROM, a flash memory, an erasable programmable read only memory (EPROM), an electrically erasable programmable read only memory (EEPROM), or the like, a hard disk drive (HDD), a magnetic disk, a flexible disk, an optical disk, a compact disk, a mini disk, a digital versatile disc (DVD) and a drive device therefor, or any storage medium used in the future.

The configuration has been described thus far, in which the function of each component of the travel plan generation unit 320 is realized by, one of hardware and software or the like. However, the present invention is not limited thereto, and a configuration in which part of the components of the travel plan generation unit 320 may be realized by dedicated hardware and another part of the components is realized by software or the like. For example, the functions of the part of the components can be realized by the processing circuit 50 as dedicated hardware, and the functions of the other part of the components can be realized by the processing circuit 50 as the processor 51 reading out and executing the program stored in the memory 52.

As described above, the travel plan generation unit 320 can realize the functions described above by hardware, software, or the like, or a combination thereof.

While the invention has been described in detail, the forgoing description is in all aspects illustrative and not restrictive. It is understood that numerous other modifications can be devised without departing from the scope of the invention.

It should be noted that Embodiments of the present invention can be arbitrarily combined and can be appropriately modified or omitted without departing from the scope of the invention.

The invention claimed is:

1. A travel plan generation device used for an autonomous driving system of a vehicle, comprising:
   circuitry configured to
      generate a restriction related to a quantity of state of the vehicle, the quantity of state of the vehicle includes at least one of a sideslip angle of a vehicle body, a sideslip angle of a tire, a steering angle, a steering angle velocity, an acceleration of the vehicle, and a yaw rate, and
      generate a target trajectory and a target vehicle speed of the vehicle as a travel plan so as to satisfy the restriction by using one filter that is to be chosen from Bayes filters including a particle filter, a Kalman filter, and an extended Kalman filter as a state estimation calculation without a convergence calculation, state variables input to the one filter include an azimuth of the vehicle, a velocity, an acceleration of the vehicle, the steering angle, the steering angle velocity, the yaw rate, and the sideslip angle of vehicle body,
   wherein the autonomous driving system controls movement of the vehicle using the travel plan.

2. The travel plan generation device according to claim 1, wherein, after imposing a constraint condition in which a tire generating force of vehicle does not exceed a friction circle limit, the restriction is generated as a range of values that the quantity of state of the vehicle can take in order to satisfy the constraint condition.

3. The travel plan generation device according to claim 2, wherein, the constraint condition is determined based on a condition of a road surface acquired from outside of the travel plan generation device.

4. The travel plan generation device according to claim 1, wherein the state estimation calculation is configured to use the particle filter that approximates a probability density distribution of a state by a plurality of particles of the Bayes filter.

5. The travel plan generation device according to claim 4, wherein the circuitry is configured to determine an input value to a system model used for the particle filter based on the restriction.

6. The travel plan generation device according to claim 4, wherein, based on a predicted trajectory of an obstacle obtained from outside of the travel plan generation device, the circuitry is configured to determine whether or not the obstacle exists in a region where the vehicle exists for each of the plurality of particles in the particle filter, and, when determined that the obstacle exists, set weight of a particle in which existence of the obstacle is determined to 0.

7. The travel plan generation device according to claim 6, wherein the state estimation calculation includes, as its observed variables, at least one of a velocity of the vehicle, lateral deviation from the vehicle to a target lane, and an invasion distance of the obstacle into the region set around the vehicle.

8. The travel plan generation device according to claim 1, wherein the restriction is defined in a range of values that at least one of the sideslip angle of vehicle body, the sideslip angle of tire, the steering angle, the steering angle velocity, the velocity, acceleration, and the yaw rate can take.

9. The travel plan generation device according to claim 1, wherein the state variables further include position of the vehicle.

10. An autonomous driving system comprising:
    the travel plan generation device according to claim 1;
    an information acquisition device configured to acquire information on obstacle around the vehicle; and
    an environmental state estimation device configured to acquire the information on obstacle from the information acquisition device and acquire a predicted trajectory of the obstacle, wherein,
    based on the predicted trajectory of the obstacle acquired from the environmental state estimation device, the travel plan generation device is configured to generate the travel plan that avoids contact between the vehicle and the obstacle.

11. The autonomous driving system according to claim 10, further comprising a vehicle control device including circuitry configured to calculate a steering angle, a target driving force and a target braking force of the vehicle based on the travel plan generated in the travel plan generation device to control the trajectory of the vehicle and the acceleration and deceleration of the vehicle.

12. The autonomous driving system according to claim 11, wherein
    the information acquisition device is configured to acquire information on surrounding environment around the vehicle,
    the environmental state estimation device is configured to estimate a coefficient of friction of road surface on a road surface on which the vehicle travels based on the information on the surrounding environment acquired in the information acquisition device, and the travel plan generation device is configured to generate the restriction using the coefficient of friction of road surface estimated in the environmental state estimation device.

13. The autonomous driving system according to claim 11, wherein the information acquisition device is configured to acquire a coefficient of friction of road surface on a road surface on which the vehicle travels by communicating outside of the vehicle, and the travel plan generation device is configured to generate the restriction using the coefficient of friction of road surface acquired in the information acquisition device.

14. An autonomous driving system comprising:

the travel plan generation device according to claim 1; and a vehicle control device including circuitry configured to calculate a steering angle, a target driving force and a target braking force of the vehicle based on the travel plan generated in the travel plan generation device to control the trajectory of the vehicle and the acceleration and deceleration of the vehicle.

15. The autonomous driving system according to claim 14, further comprising:

an information acquisition device configured to acquire information on surrounding environment around the vehicle; and an environmental state estimation device configured to estimate a coefficient of friction of road surface on a road surface on which the vehicle travels based on the information on the surrounding environment acquired in the information acquisition device, wherein the travel plan generation device is configured to generate the restriction using the coefficient of friction of road surface estimated in the environmental state estimation device.

16. The autonomous driving system according to claim 14, further comprising an information acquisition device configured to acquire a coefficient of friction of road surface on a road surface on which the vehicle travels by communicating outside of the vehicle, wherein the travel plan generation device is configured to generate the restriction using the coefficient of friction of road surface acquired in the information acquisition device.

17. A travel plan generation device used for an autonomous driving system of a vehicle, comprising:

circuitry configured to generate a restriction related to a quantity of state of the vehicle, the quantity of state of the vehicle includes at least one of a sideslip angle of a vehicle body, a sideslip angle of a tire, a steering angle, a steering angle velocity, an acceleration of the vehicle, and a yaw rate, and generate a target trajectory and a target vehicle speed of the vehicle as a travel plan so as to satisfy the restriction by a state estimation calculation without a convergence calculation, the state estimation being based on state variables including an azimuth of the vehicle, a velocity, an acceleration of the vehicle, the steering angle, the steering angle velocity, the yaw rate, and the sideslip angle of vehicle body, and after imposing a constraint condition in which a tire generating force of vehicle does not exceed a friction circle limit, the restriction is generated as a range of values that the quantity of state of the vehicle can take in order to satisfy the constraint condition, wherein the autonomous driving system controls movement of the vehicle using the travel plan.

\* \* \* \* \*